US008915998B2

(12) United States Patent
Götz et al.

(10) Patent No.: US 8,915,998 B2
(45) Date of Patent: Dec. 23, 2014

(54) PIGMENT GRANULATE, METHOD FOR PRODUCING THE SAME AND USE THEREOF

(75) Inventors: Christian Götz, Seligenstadt (DE); Gerd Tauber, Seligenstadt (DE); Ralph McIntosh, Hanau (DE); Werner Kalbitz, Rodenbach (DE); Frank Stenger, Alzenau (DE); Rüdiger Mertsch, Wiesbaden (DE); Mandy Mühlbach, Seligenstadt (DE)

(73) Assignee: Evonik Carbon Black GmbH, Hanau (DE)

( * ) Notice: Subject to any disclaimer, the term of this patent is extended or adjusted under 35 U.S.C. 154(b) by 133 days.

(21) Appl. No.: 13/131,372

(22) PCT Filed: Nov. 19, 2009

(86) PCT No.: PCT/EP2009/065500
§ 371 (c)(1),
(2), (4) Date: May 26, 2011

(87) PCT Pub. No.: WO2010/060858
PCT Pub. Date: Jun. 3, 2010

(65) Prior Publication Data
US 2011/0232531 A1    Sep. 29, 2011

(30) Foreign Application Priority Data
Nov. 27, 2008 (DE) .......................... 10 2008 044 116

(51) Int. Cl.
| | | |
|---|---|---|
| C09C 1/44 | (2006.01) |
| C09B 67/46 | (2006.01) |
| B82Y 30/00 | (2011.01) |
| C09B 67/08 | (2006.01) |
| C09B 67/42 | (2006.01) |
| C09C 1/48 | (2006.01) |
| C09C 1/50 | (2006.01) |
| C09C 1/52 | (2006.01) |
| C09C 1/56 | (2006.01) |
| C09C 1/58 | (2006.01) |
| C09C 3/10 | (2006.01) |

(52) U.S. Cl.
CPC ............. C09B 67/0089 (2013.01); B82Y 30/00 (2013.01); C09B 67/0013 (2013.01); C09B 67/0095 (2013.01); C09C 1/48 (2013.01); C09C 1/50 (2013.01); C09C 1/52 (2013.01); C09C 1/56 (2013.01); C09C 1/58 (2013.01); C09C 3/10 (2013.01); C01P 2004/62 (2013.01); C01P 2004/64 (2013.01); C01P 2006/12 (2013.01); C01P 2006/14 (2013.01); C01P 2006/19 (2013.01)
USPC ............ 106/476; 106/477; 106/493

(58) Field of Classification Search
None
See application file for complete search history.

(56) References Cited

U.S. PATENT DOCUMENTS

| | | | |
|---|---|---|---|
| 3,133,893 A | 5/1964 | Newmann |
| 3,314,814 A | 4/1967 | Newman |
| 3,519,452 A | 7/1970 | Rivin |
| 3,660,133 A | 5/1972 | Van Der Schuyt et al. |
| 3,705,043 A | 12/1972 | Zabiak |
| 3,749,670 A | 7/1973 | Ormsbee |
| 3,841,888 A | 10/1974 | Belde |
| 3,903,034 A | 9/1975 | Zabiak et al. |
| 3,946,138 A | 3/1976 | Jones |
| 3,978,019 A | 8/1976 | Oelmann et al. |
| 3,998,652 A | 12/1976 | Aign |
| 4,055,439 A | 10/1977 | Babler |
| 4,075,160 A | 2/1978 | Mills |
| 4,076,527 A | 2/1978 | Nealy |
| 4,243,994 A | 1/1981 | Kobayashi et al. |
| 4,366,139 A | 12/1982 | Kuhner |
| 4,368,582 A | 1/1983 | Graser |
| 4,435,377 A | 3/1984 | Rothbuhr |
| 4,435,378 A | 3/1984 | Reck |
| 4,486,033 A | 12/1984 | Parrotta |

(Continued)

FOREIGN PATENT DOCUMENTS

| | | |
|---|---|---|
| CA | 2207414 | 6/1996 |
| CA | 2 740 672 A1 | 4/2010 |

(Continued)

OTHER PUBLICATIONS

International Search Report for PCT/EP2009/065500 filed Nov. 19, 2009.

(Continued)

*Primary Examiner* — Kaj K Olsen
*Assistant Examiner* — Ross J Christie
(74) *Attorney, Agent, or Firm* — Law Office of: Michael A. Sanzo, LLC

(57) ABSTRACT

The invention relates to a pigment granulate which contains 40 to 65% by weight of pigment and at least 10% by weight of a compound of general formula (I) $CH_3—(CH_2)_n—CH_2—O—[(CH_2)_p—O]_m—H$, wherein n=8-18, p=1-4 and m=35-100, the weight ratio of the compound of general formula I to the pigment being ≥ the STSA surface area of the pigment in $m^2/g$ multiplied by 0.0021 $g/m^2$ and the mass-weighted particle size of the pigment granulate being <20 μm. The pigment granulate can be produced by dispersing the pigment and the compound of formula I in a solvent and then drying the dispersion obtained. The pigments according to the invention can be used for dying and/or the antistatic finishing in water-based paints and lacquer systems, dispersion on paints, printing inks, ink systems and coating systems.

20 Claims, No Drawings

(56) References Cited

U.S. PATENT DOCUMENTS

| | | |
|---|---|---|
| 4,536,776 A | 8/1985 | Knirsch |
| 4,698,913 A | 10/1987 | Voll |
| 4,755,358 A | 7/1988 | Voll et al. |
| 4,756,759 A * | 7/1988 | Amon et al. ............... 106/31.65 |
| 4,836,852 A | 6/1989 | Knirsch |
| 4,879,335 A | 11/1989 | Hirota |
| 4,909,853 A | 3/1990 | Wienkenhover |
| 4,963,616 A | 10/1990 | Jenekhe |
| 5,021,291 A | 6/1991 | Kobayashi |
| 5,085,698 A | 2/1992 | Ma |
| 5,164,232 A | 11/1992 | Henseleit |
| 5,236,992 A | 8/1993 | Bush |
| 5,320,668 A | 6/1994 | Shields |
| 5,382,621 A | 1/1995 | Laube |
| 5,430,088 A | 7/1995 | Ohashi et al. |
| 5,531,818 A | 7/1996 | Lin |
| 5,554,739 A | 9/1996 | Belmont |
| 5,609,671 A | 3/1997 | Nagasawa |
| 5,620,743 A | 4/1997 | Harth |
| 5,639,817 A | 6/1997 | Probst |
| 5,672,198 A | 9/1997 | Belmont |
| 5,713,988 A | 2/1998 | Belmont et al. |
| 5,760,112 A | 6/1998 | Hirota |
| 5,772,975 A | 6/1998 | Mise et al. |
| 5,837,044 A | 11/1998 | Santilli |
| 5,851,280 A | 12/1998 | Belmont |
| 5,859,120 A | 1/1999 | Karl |
| 5,900,029 A | 5/1999 | Belmont |
| 5,922,118 A | 7/1999 | Johnson |
| 5,929,134 A | 7/1999 | Lent |
| 5,954,866 A | 9/1999 | Ohta et al. |
| 5,977,209 A | 11/1999 | Breton |
| 6,056,933 A | 5/2000 | Vogler |
| 6,063,182 A | 5/2000 | Babler |
| 6,099,818 A | 8/2000 | Freund |
| 6,132,505 A | 10/2000 | Linde |
| 6,136,286 A | 10/2000 | Okuyama |
| 6,171,382 B1 | 1/2001 | Stubbe |
| 6,212,794 B1 | 4/2001 | Zhu |
| 6,221,142 B1 | 4/2001 | Wang |
| 6,224,735 B1 | 5/2001 | Akutsu |
| 6,228,928 B1 | 5/2001 | Soeda et al. |
| 6,242,382 B1 | 6/2001 | Bratz |
| 6,251,983 B1 | 6/2001 | Vogler |
| 6,290,767 B1 | 9/2001 | Bergemann |
| 6,312,513 B1 | 11/2001 | Hoefer |
| 6,337,302 B1 | 1/2002 | Teng |
| 6,358,487 B1 | 3/2002 | Omae et al. |
| 6,387,168 B1 | 5/2002 | Koitabashi |
| 6,403,695 B1 | 6/2002 | Soeda et al. |
| 6,451,100 B1 | 9/2002 | Karl |
| 6,471,763 B1 | 10/2002 | Karl |
| 6,491,976 B2 | 12/2002 | Horiuchi |
| 6,503,311 B1 | 1/2003 | Karl |
| 6,569,231 B1 | 5/2003 | Mathias |
| 6,582,505 B1 | 6/2003 | Bouvy |
| 6,646,023 B1 * | 11/2003 | Nyssen .................... 523/122 |
| 6,660,075 B2 | 12/2003 | Bergemann |
| 6,685,769 B1 | 2/2004 | Karl |
| 6,715,420 B2 | 4/2004 | Blake |
| 6,758,891 B2 | 7/2004 | Bergemann et al. |
| 6,780,389 B2 | 8/2004 | Karl |
| 6,783,836 B2 | 8/2004 | Bennett |
| 6,821,334 B2 | 11/2004 | Nakamura |
| 6,858,569 B2 | 2/2005 | Yokota et al. |
| 6,956,006 B1 | 10/2005 | Mirsky |
| 6,960,250 B2 | 11/2005 | Luethge |
| 7,005,004 B2 | 2/2006 | Kalbitz |
| 7,160,377 B2 | 1/2007 | Zoch |
| 7,172,652 B2 | 2/2007 | Zoch et al. |
| 7,198,668 B2 | 4/2007 | Reisacher et al. |
| 7,217,405 B2 | 5/2007 | Karl |
| 7,300,964 B2 | 11/2007 | Niedermeier |
| 7,435,857 B2 | 10/2008 | Poellmann |
| 8,236,274 B2 | 8/2012 | Quitmann et al. |
| 8,328,930 B2 | 12/2012 | Tauber et al. |
| 8,372,191 B2 | 2/2013 | Tauber et al. |
| 2001/0036994 A1 | 11/2001 | Bergemann |
| 2002/0041317 A1 | 4/2002 | Kashiwazaki |
| 2002/0156177 A1 | 10/2002 | Freund |
| 2003/0000409 A1 | 1/2003 | Blake |
| 2003/0013797 A1 | 1/2003 | Thielen et al. |
| 2003/0101901 A1 | 6/2003 | Bergemann et al. |
| 2003/0114350 A1 | 6/2003 | Schmitt et al. |
| 2003/0134938 A1 | 7/2003 | Nakamura |
| 2003/0180210 A1 | 9/2003 | Karl |
| 2004/0087707 A1 | 5/2004 | Zoch |
| 2004/0109944 A1 | 6/2004 | Schmitt et al. |
| 2004/0123773 A1 | 7/2004 | Butler |
| 2004/0202603 A1 | 10/2004 | Fischer et al. |
| 2004/0248731 A1 | 12/2004 | Vogel |
| 2005/0014864 A1 | 1/2005 | Akers |
| 2005/0062205 A1 | 3/2005 | Zak |
| 2005/0090609 A1 | 4/2005 | Reisacher |
| 2006/0086834 A1 | 4/2006 | Pfeffer |
| 2006/0230550 A1 | 10/2006 | Hees |
| 2006/0243165 A1 | 11/2006 | Luthge |
| 2007/0031319 A1 | 2/2007 | Luthge |
| 2007/0043157 A1 | 2/2007 | Riebel et al. |
| 2007/0044682 A1 | 3/2007 | Nick |
| 2007/0076068 A1 | 4/2007 | Guo |
| 2007/0076071 A1 | 4/2007 | Iu |
| 2008/0110552 A1 | 5/2008 | Arnold |
| 2008/0214730 A1 | 9/2008 | Henry |
| 2008/0219915 A1 | 9/2008 | Quitmann |
| 2009/0035210 A1 | 2/2009 | Krauss |
| 2009/0155157 A1 * | 6/2009 | Stenger et al. ............... 423/345 |
| 2009/0305011 A1 | 12/2009 | McIntosh |
| 2010/0147187 A1 | 6/2010 | Tauber |
| 2010/0180794 A1 | 7/2010 | Tauber |
| 2010/0248120 A1 | 9/2010 | Riebel |
| 2011/0034611 A1 | 2/2011 | Pelster |
| 2011/0207872 A1 | 8/2011 | Schinkel |
| 2011/0236816 A1 | 9/2011 | Stanyschofsky et al. |

FOREIGN PATENT DOCUMENTS

| | | |
|---|---|---|
| CN | 1858531 A | 11/2006 |
| DE | 203 711 C | 10/1908 |
| DE | 25 40 355 | 3/1976 |
| DE | 30 41 188 A1 | 6/1982 |
| DE | 36 15 571 A1 | 11/1987 |
| DE | 43 08 488 A1 | 9/1994 |
| DE | 195 21 565 | 1/1997 |
| DE | 196 13 796 | 10/1997 |
| DE | 197 31 572 | 1/1999 |
| DE | 197 48 575 | 5/1999 |
| DE | 198 39 925 A1 | 10/1999 |
| DE | 198 24 947 | 12/1999 |
| DE | 199 34 282 | 1/2001 |
| DE | 100 12 784 | 9/2001 |
| DE | 101 49 805 | 4/2003 |
| DE | 102 42 875 A1 | 5/2003 |
| DE | 102 38 149 | 2/2004 |
| DE | 10 2004 058 271 | 6/2006 |
| DE | 10 2007 026 214 A1 | 12/2008 |
| DE | 10 2007 026 551 | 12/2008 |
| EP | 0 036 520 A2 | 9/1981 |
| EP | 0 176 707 A1 | 4/1986 |
| EP | 0 259 130 A2 | 3/1988 |
| EP | 0 263 412 | 4/1988 |
| EP | 0 282 855 A2 | 9/1988 |
| EP | 0 608 892 | 8/1994 |
| EP | 0 655 516 A1 | 5/1995 |
| EP | 0 792 920 | 9/1997 |
| EP | 0 803 780 A1 | 10/1997 |
| EP | 0 857 764 A2 | 8/1998 |
| EP | 0 969 052 A1 | 1/2000 |
| EP | 0 982 378 | 3/2000 |
| EP | 1 061 106 A1 | 12/2000 |
| EP | 1 061 107 A1 | 12/2000 |
| EP | 1 103 173 A1 | 5/2001 |
| EP | 1 134 261 A2 | 9/2001 |
| EP | 1 167 470 A | 1/2002 |

(56) References Cited

FOREIGN PATENT DOCUMENTS

| | | |
|---|---|---|
| EP | 1 347 018 A1 | 9/2003 |
| EP | 1 783 178 | 5/2007 |
| FR | 1 233 251 A | 10/1960 |
| GB | 895990 | 5/1962 |
| JP | 1-272645 | 10/1989 |
| JP | 3-124772 | 5/1991 |
| JP | 4-18438 | 1/1992 |
| JP | 5-78110 | 3/1993 |
| JP | 6-228371 | 8/1994 |
| JP | 6-279624 | 10/1994 |
| JP | 7-258578 | 10/1995 |
| JP | 7-268148 | 10/1995 |
| JP | 08-015895 | 1/1996 |
| JP | 9-67528 | 3/1997 |
| JP | 9-124312 | 5/1997 |
| JP | 9-235485 | 9/1997 |
| JP | 10-140033 | 5/1998 |
| JP | 11-012487 | 1/1999 |
| JP | 11-092686 A | 4/1999 |
| JP | 11-158425 | 6/1999 |
| JP | 11-189735 | 7/1999 |
| JP | 11-189736 | 7/1999 |
| JP | 11-302557 | 11/1999 |
| JP | 11-315220 | 11/1999 |
| JP | 11-349309 | 12/1999 |
| JP | 2000-212468 | 8/2000 |
| JP | 2000-248118 | 9/2000 |
| JP | 2000-248194 | 9/2000 |
| JP | 2000-248196 | 9/2000 |
| JP | 2000-248197 | 9/2000 |
| JP | 2000-290529 | 10/2000 |
| JP | 2001-40240 | 2/2001 |
| JP | 2001-214068 | 8/2001 |
| JP | 2001-240768 | 9/2001 |
| JP | 2001-254033 | 9/2001 |
| JP | 2001-329205 | 11/2001 |
| JP | 2002-080758 | 3/2002 |
| JP | 2003-049101 | 2/2003 |
| JP | 2003-201418 A | 7/2003 |
| JP | 2004-067903 | 3/2004 |
| JP | 2004-75985 | 3/2004 |
| JP | 2004-224948 | 8/2004 |
| JP | 2006-008899 | 1/2006 |
| JP | 2006-022270 | 1/2006 |
| JP | 2006-052413 | 2/2006 |
| JP | 2006-126387 | 5/2006 |
| SU | 532612 | 2/1977 |
| SU | 887587 | 12/1981 |
| WO | WO 92/04415 | 3/1992 |
| WO | WO 92/13983 | 8/1992 |
| WO | WO 95/23038 | 8/1995 |
| WO | WO 96/18688 | 6/1996 |
| WO | WO 96/18690 | 6/1996 |
| WO | WO 96/18694 A2 | 6/1996 |
| WO | WO 97/32571 A1 | 9/1997 |
| WO | WO 98/42192 | 10/1998 |
| WO | WO 98/42778 | 10/1998 |
| WO | WO 98/45361 | 10/1998 |
| WO | WO 99/58617 | 11/1999 |
| WO | WO 00/09254 | 2/2000 |
| WO | WO 00/77104 | 12/2000 |
| WO | WO 01/55050 | 8/2001 |
| WO | WO 03/014238 A | 2/2003 |
| WO | WO 03/055959 A1 | 7/2003 |
| WO | WO 03/064540 A1 | 8/2003 |
| WO | WO 2004/046256 A1 | 6/2004 |
| WO | WO 2005/017047 A1 | 2/2005 |
| WO | WO 2005/022667 A2 | 3/2005 |
| WO | WO 2005/028978 A1 | 3/2005 |
| WO | WO 2006/061110 A1 | 6/2006 |
| WO | WO 2006/066132 A2 | 6/2006 |
| WO | WO 2007/027625 A2 | 3/2007 |
| WO | WO 2008/148639 A2 | 12/2008 |
| WO | WO 2010/043562 A1 | 4/2010 |
| WO | WO 2007/039604 A2 | 4/2012 |

OTHER PUBLICATIONS

Written Opinion of the International Searching Authority for PCT/EP2009/065500 filed Nov. 19, 2009.
International Preliminary Report on Patentability for PCT/EP2009/065500 filed Nov. 19, 2009.
English language abstract for CN 1858531 A, listed as document B1 above.
English language abstract for DE 36 15 571, listed as document B4 above.
English language abstract for DE197 31 572, listed as document B7 above.
English language abstract for DE 198 24 947, listed as document B9 above.
English language abstract for DE 10 2004 058 271, listed as document B12 above.
English language abstract for DE 10 2007 026 214 A1, listed as document B14 above.
English language translation of summary for FR 1 233 251, listed as document B30 above.
English language abstract for JP 3-124772, listed as document B32 above.
English language abstract for JP 5-78110, listed as document B33 above.
English language abstract for JP 08-015895, listed as document B35 above.
English language abstract for JP 9-67528, listed as document B36 above.
English language abstract for JP 9-124312, listed as document B37 above.
English language abstract for JP 11-158425, listed as document B38 above.
English language translation for JP 11-189735, listed as document B39 above.
English language abstract for JP 11-189736, listed as document B40 above.
English language Abstract for JP 11-315220, listed as document B41 above.
English language abstract for JP 2000-212468, listed as document B42 above.
English language abstract for JP 2000-248197, listed as document B43 above.
English language abstract for JP 2000-248194, listed as document B44 above.
English language abstract for JP 2000-248118, listed as document B45 above.
English language abstract for JP 2000-248196, listed as document B46 above.
English language abstract for JP 2000-290529, listed as document B47 above.
English language abstract for JP 2001-40240, listed as document B48 above.
English language abstract for JP 2001-254033, listed as document B49 above.
English language abstract for JP 2001-329205, listed as document B50 above.
English language abstract for JP 2004-75985, listed as document B51 above.
English language abstract for JP 2006-008899, listed as document B52 above.
English language abstract for SU 532612, listed as document B53 above.
English language abstract for SU 887587, listed as document B54 above.
English language abstract for WO 92/13983, listed as document B55 above.
English language abstract for WO 01/55050, listed as document B64 above.
English language abstract for WO 03/055959, listed as document B66 above.
Franklin, et al., "An Enhanced CVD Approach to Extensive Nanotube Networks with Directionality," *Advanced Materials* 12:890-894 (2000).

(56) References Cited

OTHER PUBLICATIONS

McMillan, et al., "High Velocity Attrition Nozzles in Fluidized Beds," *Powder Technology* 175:133-141 (2007).
Ohkita, et al., "The Competitive Reactions of Initiator Fragments and Growing Polymer Chains Against the Surface of Carbon Black," *Carbon* vol. 16:41-45 (1978).
Wang, et al., "Using Pulsed Flow to Overcome Defluidization," *Chemical Engineering Science* 60:5177-5181 (2005).
U.S. Appl. No. 13/031,694, filed Feb. 22, 2011, Schinkel.
English language abstract for WO 2010/043562 A1, listed as document B4 above.
*Chemielexikon Römpp*; RÖMPP Online-ID=RD-07-00259, Gas Black; http://www.roempp.com/prod/roemp.php.
"Improved Test for Determination of Carbon Black Structure" presented by Wesley Wampler; Carbon Black World 2004; Nov. 15, 2004; XP002637916.
English language abstract for DE 100 12 784 listed as document B2 above.
English language abstract for DE 101 49 805 listed as document B3 above.
English language abstract for DE 102 38 149 listed as document B4 above.
English language abstract for JP 2004-224948 listed as document B5 above.
English language abstract for JP 2006-052413 listed as document B6 above.
English language abstract for JP-2006-126387 listed as document B7 above.
English language abstract for JP 10-510861.
English language abstract for RU 2173327.
English language abstract for RU 2200562.
English language abstract for RU 2211230.
Machine translation of JP 2004-224948 listed as document B5 above.
Machine translation of JP 2006-052413 listed as document B6 above.
Machine translation of JP-2006-126387 listed as document B7 above.
English language abstract for JP 6-228371, listed as document B1 above.
Machine translation of JP 6-228371, listed as document B1 above.
English language abstract for JP 6-279624, listed as document B2 above.
English language abstract for JP 9-235485, listed as document B3 above.
English language abstract for JP 10-140033, listed as document B4 above.
English language abstract for JP 11-012487, listed as document B5 above.
Machine translation of JP 11-012487, listed as document B5 above.
English language abstract for JP 11-092686, listed as document B6 above.
Machine translation of JP 11-092686, listed as document B6 above.
English language abstract for JP 11-349309, listed as document B7 above.
Machine translation of JP 11-349309, listed as document B7 above.
English language abstract for JP 2001-240768, listed as document B8 above.
Machine translation of JP 2001-240768, listed as document B8 above.
English language abstract for JP 2003-201418, listed as document B9 above.
English language abstract for JP 2006-022270, listed as document B10 above.
Machine translation of JP2006-022270, listed as document B10 above.
English language abstract for JP 2001-214068, listed as document B12 above.
Machine translation of JP2001-214068, listed as document B12 above.
U.S. Appl. No. 13/538,861, filed Jun. 29, 2012, Quitmann, et al.
Gerhartz, et al., "Gas Black and Channel Black," *Ullmann's Encyclopedia of Industrial Chemistry* A5:148-150; XP-002465931 (1986).
Gerspacher, M., "Dynamic Viscoelastic Properties of Loaded Elastomers," Chapter 11 Carbon Black, Donnet, et al. eds., Marcel Dekker Inc., New York, ed. 2 pp. 377-387 (1993).
Funt, et al., "Carbon Black in Plastics," Chapter 12 Carbon Black, Donnet, et al. eds., Marcel Dekker Inc., New York, ed. 2 p. 389-408 (1993).
English language abstract for JP 1-272645, listed as document B3 above and published Oct. 31, 1989.
English language abstract for JP 4-18438, listed as document B4 above and published Jan. 22, 1992.
English language abstract for JP 7-268148, listed as document B5 above and published Oct. 17, 1995.
English language abstract for JP 11-302557, listed as document B6 above and published Nov. 2, 1999.
English language translation of German patent reference DE 203 711 C, listed as document B1 above and published Oct. 27, 1908.
English language text of Office Action for counterpart Chinese application 200980147797.5, which is nat'l stage of PCT/EP2009/065500, filed on Nov. 19, 2009.
English language abstract for JP 2002-080758, listed as document B1 above.
Machine translation of JP 2002-080758, listed as document B1 above.
English language abstract for JP 2003-049101, listed as document B2 above.
Machine translation of JP 2003-049101, listed as document B2 above.
English language abstract for JP 2004-067903, listed as document B3 above.
Machine translation of JP 2004-067903, listed as document B3 above.

\* cited by examiner

PIGMENT GRANULATE, METHOD FOR PRODUCING THE SAME AND USE THEREOF

CROSS REFERENCE TO RELATED APPLICATIONS

The present application is US national stage of international application, PCT/EP2009/065500 which had an international filing date of Nov. 19, 2009, and which was published in German under PCT Article 21(2) on Jun. 3, 2010. Priority is claimed to German application DE 10 2008 044 116.3, filed on Nov. 27, 2008.

The invention relates to pigment granules, to a process for producing them and to their use.

Powder pigments are used for colouring thermoplastics and thermosets. An advantage of the powder pigments is that they are not dependent on a carrier material. This advantage, however, is often achieved at the expense of dispersibility.

To improve the dispersibility the pigments are coated with resin (DE 2540355) or with polymers (U.S. Pat. No. 3,133, 893).

Specific drying methods are known from EP 0036520, and involve heating finely divided pigments and a liquid whose critical temperature is below the decomposition temperature of the pigment to temperatures above the critical temperature of the liquid, under pressure, and then releasing the pressure, the temperature constantly being held above the dew line of the liquid.

EP 0282855, moreover, discloses pigment preparations which comprise an organic pigment and/or carbon black and a surfactant from the alkylbenzenesulphonates series or specific sulphosuccinic esters, and which, after wet comminution if appropriate, are dried from aqueous medium by spray drying or freeze drying.

EP 1103173 discloses pigment preparations for colouring seed, comprising a pigment and a polyether polyol.

EP 857764 discloses inorganic pigment granules which comprise inorganic pigments and water-soluble, hydrophilic or hydrophobic/hydrophilic auxiliaries in amounts of 0.1% to 10% by weight, based on pigment, and have an average particle size of 50 to 1500 μm.

Furthermore, EP 1090081 discloses aqueous dispersions which comprise a pigment and a dispersant of the formula

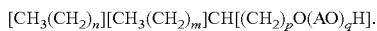

Moreover, pigment preparations are known from U.S. Pat. No. 6,063,182 and DE 19731572, and ink jet ink from U.S. Pat. No. 5,837,044.

WO 2003055959 discloses particulate solids preparations comprising a particulate solid and 0.05%-9% by weight of a compound selected from the group of the polyglycols or diols having at least one non-hydrogen terminal group, or alkylsulphonates.

Furthermore, US 2005090609 discloses pigment granules having an average particle size of 50-5000 μm and a BET surface area of <=15 $m^2$/g, comprising inter alia 10-40% by weight of at least one nonionic surface-active additive based on polyethers.

The known pigment preparations have the disadvantage that, without addition of additives, the dispersing behaviour in water or water-based surface-coating systems is poor.

DE 102007026551 discloses a pigment preparation comprising at least one pigment and at least one compound of the general formula $CH_3-(CH_2)_n-CH_2-O-[(CH_2)_p-O]_m-H$, with n=8-18, p=1-4 and m=15-25.

It is an object of the present invention to provide pigment granules which exhibit good dispersing behaviour in water or water-based surface-coating systems in conjunction with very good surface-coating coloristics, and for which, in the crosslinked coating film, there is no floating (migration to the surface of the coating film) of any of the components of the pigment granules.

The invention provides pigment granules which are characterized in that they comprise 40-65%, preferably 43-63%, more preferably 45-60%, very preferably 45-56%, by weight, based on the pigment granules, of pigment, and at least 10%, preferably at least 12%, more preferably at least 15%, very preferably at least 20%, by weight, based on the pigment granules, of a compound of the general formula I

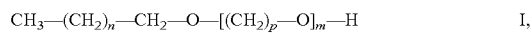

with n=8-18, preferably n=10-18, more preferably n=12-17, very preferably n=14-16, p=1-4, preferably p=2, and m=35-100, preferably m=35-90, more preferably m=40-80, very preferably m=45-70; the weight ratio of the compound of the general formula I to pigment is greater than or equal to the STSA surface area of the pigment in $m^2$/g multiplied by 0.0021 g/$m^2$; and the mass-weighted average particle size of the pigment granules is <20 μm, preferably <15 μm, more preferably <12 μm, very preferably <9 μm.

Fixing a lower limit for the weight ratio of the compound of the general formula I to pigment makes it possible to ensure at least a minimum coating of the pigment surface (STSA surface area) with compound of the general formula I.

The STSA surface area of the pigment can be less than or equal to 385 $m^2$/g, preferably less than or equal to 380 $m^2$/g.

The STSA surface area is determined for the pigments, except for the pigment blacks, in accordance with ASTM D 6556 (2004). For pigment blacks, in deviation from ASTM D 6556 (2004), the sample is dried at 105° C.

The mass-weighted average particle size of the pigment granules is determined by a laser diffraction spectroscopy method based on ISO 13320-1. The determination takes place in a HELOS laser diffraction spectrometer from Sympatec. The pigment granules are dispersed with a dispersing air pressure of 1 bar. The particle size distribution is evaluated in accordance with the Fraunhofer theory.

Pigments used can be carbon blacks, carbon aerogels or chromatic pigments.

Examples of chromatic pigments that can be used include yellow, orange, red, magenta, violet, blue, cyan, green or brown pigments. Chromatic pigments that can be used include inorganic blue pigments, such as iron blue, ultramarine blue, cobalt blue or mixed phase blue pigments, or organic blue pigments, for example phthalocyanine blue or indanthrene blue.

Carbon black used may be furnace blacks, gas blacks, lamp blacks, acetylene blacks, Si-containing blacks, known from WO 98/45361 or DE 19613796, inversion blacks, known from DE 19521565, and metal-containing blacks, known from WO 98/42778. As a carbon black it is possible with preference to use pigment blacks having an average primary particle diameter of 8 to 80 nm, preferably 10 to 35 nm, and an OAN number of 40 to 200 ml/100 g, preferably 60 to 150 ml/100 g.

The gas black can have an average primary particle diameter of 8 to 30 nm, preferably 10 to 25 nm. The gas blacks can have a pH of 2 to 5, preferably 3.5 to 4.5

The furnace black can have an average primary particle diameter of 8 to 80 nm, preferably 10-50 nm, and an OAN number of 40 to 200 ml/100 g, preferably 50 to 180 ml/100 g.

The oil absorption number (OAN) of carbon black pigments is determined in a method based on ASTM D 2414. In deviation from ASTM D 2414 (2000), the carbon black pigment is dried to constant weight at 105° C. and the oil number is reported in ml/100 g carbon black pigment.

The pH of a pigment black is determined in a method based on DIN ISO 787/9 (1995). In deviation from DIN ISO 787/9 (1995), deionized water is used (not boiled to exhaustion before use), the carbon black pigment concentration operated is 10%, the carbon black pigment suspension is stirred for 1 minute, 5 drops of ethanol always, consistently, are added for wetting, and the pH is read off when the display is constant.

The average primary particle size is determined in accordance with DIN 53206. This is a direct determination of the average primary particle size on the basis of calibrated TEM micrographs, using the TGZ3 particle size counter.

The carbon aerogels used as pigment can have a BET value of 20-1500 $m^2/g$, preferably of 100-1200 $m^2/g$, more preferably of 400-900 $m^2/g$.

The BET surface area is determined in accordance with DIN ISO 9277 (1995) in a NOVA e2000 sorption measuring instrument from Quantachrome.

The carbon aerogels used as pigment can have a mesopore volume of 0.005-5 $cm^3/g$, preferably of 0.05-3 $cm^3/g$, more preferably of 0.2-2 $cm^3/g$.

The carbon aerogels used as pigment can have an average mesopore diameter of 1.8-50 nm, preferably of 5-45 nm, more preferably of 10-35 nm.

The mesopore volume and the pore radius distribution are determined in accordance with DIN 66134 (1998) by the BJH method from the desorption data of the recorded isotherms in the relative pressure range $p/p_0$ of 0.99 to 0.34.

Further, the carbon aerogels used as pigment can have a micropore volume of 0.01-1.0 $cm^3/g$, preferably of 0.05-0.5 $cm^3/g$, more preferably of 0.1-0.35 $cm^3/g$.

The micropore volume is determined in accordance with DIN 66135-1, 66135-2, 66135-3 (2001) by the t-plot method. The t-plot is evaluated in accordance with the de Boer equation.

The carbon aerogels used as pigment can have an average particle size of less than 1 µm, preferably between 0.05 and 1 µm, more preferably between 0.1 and 1 µm, very preferably between 0.5 and 0.95 µm.

The pigment may be a mixture of pigments.

The compound of the general formula I may be preferably $CH_3—(CH_2)_n—CH_2—O—[(CH_2)_2—O]_m—H$, with n=10, 12, 14, 16 or 18 and m=35-100.

Compounds of the general formula I may be, for example, $CH_3—(CH_2)_{10}—CH_2—O—[(CH_2)_2—O]_{35}—H$, $CH_3—(CH_2)_{12}—CH_2—O—[(CH_2)_2—O]_{35}—H$, $CH_3—(CH_2)_{14}—CH_2—O—[(CH_2)_2—O]_{35}—H$, $CH_3—(CH_2)_{16}—CH_2—O—[(CH_2)_2—O]_{35}—H$, $CH_3—(CH_2)_{18}—CH_2—O—[(CH_2)_2—O]_{35}—H$, $CH_3—(CH_2)_{10}—CH_2—O—[(CH_2)_2—O]_{60}—H$, $CH_3—(CH_2)_{12}—CH_2—O—[(CH_2)_2—O]_{60}—H$, $CH_3—(CH_2)_{14}—CH_2—O—[(CH_2)_2—O]_{60}—H$, $CH_3—(CH_2)_{16}—CH_2—O—[(CH_2)_2—O]_{60}—H$, $CH_3—(CH_2)_{18}—CH_2—O—[(CH_2)_2—O]_{60}—H$, $CH_3—(CH_2)_{10}—CH_2—O—[(CH_2)_2—O]_{90}—H$, $CH_3—(CH_2)_{12}—CH_2—O—[(CH_2)_2—O]_{90}—H$, $CH_3—(CH_2)_{14}—CH_2—O—[(CH_2)_2—O]_{90}—H$, $CH_3—(CH_2)_{16}—CH_2—O—[(CH_2)_2—O]_{90}—H$ or $CH_3—(CH_2)_{18}—CH_2—O—[(CH_2)_2—O]_{90}—H$.

The pigment granules may comprise a biocide, pH regulator, humidifier, adhesion agent, flow assistant or defoamer.

The pigment granules may comprise a precipitated and/or fumed silica.

The pigment granules of the invention may comprise a dispersant. The dispersant may be a nonionic, a cationic, an anionic or an amphoteric wetting agent. The pigment granules of the invention, apart from the compound of the general formula I, may be dispersant-free.

The pigment granules may consist of 40-65%, preferably 43-63%, more preferably 45-60%, very preferably 45-56%, by weight, based on the pigment granules, of pigment, at least 10%, preferably at least 12%, more preferably at least 15%, very preferably at least 20%, by weight, based on the pigment granules, of a compound of the general formula I $$CH_3—(CH_2)_n—CH_2—O—[(CH_2)_p—O]_m—H \qquad I,$$

with n=8-18, preferably n=10-18, more preferably n=12-17, very preferably n=14-16, p=1-4, preferably p=2, and m=35-100, preferably m=35-90, more preferably m=40-80, very preferably m=45-70, optionally a pH regulator, optionally a humidifier, optionally an adhesion agent, optionally a defoamer, optionally a flow assistant and optionally a biocide; may have a weight ratio of the compound of the general formula I to pigment of greater than or equal to the STSA surface area of the pigment in $m^2/g$ multiplied by 0.0021 $g/m^2$; and may have a mass-weighted average particle size of the pigment granules of <20 µm, preferably <15 µm, more preferably <12 µm, very preferably <9 µm.

The pigment granules may have a residual moisture content of 0% to 20% by weight, preferably 0.1% to 5% by weight, as measured to DIN ISO 787-2.

The pigment granules may comprise 0% to 5% by weight, preferably 0.1% to 3% by weight, of pH regulator.

The pigment granules may comprise 0% to 5% by weight, preferably 0.1% to 3% by weight, of humidifier.

The pigment granules may comprise 0% to 5% by weight, preferably 0.1% to 3% by weight, of adhesion agent.

The pigment granules may comprise 0% to 5% by weight, preferably 0.1% to 3% by weight, of defoamer.

The pigment granules may comprise 0% to 5% by weight, preferably 0.1% to 3% by weight, of flow assistant.

The pigment granules may comprise 0% to 5% by weight, preferably 0.1% to 3% by weight, of biocide.

In one embodiment of the invention the pigment granules may consist of 40-65%, preferably 43-63%, more preferably 45-60%, very preferably 45-56%, by weight, based on the pigment granules, of pigment selected from the group consisting of gas black, furnace black, Pigment Yellow 74, Pigment Blue 15:3 and Pigment Red 122, at least 10%, preferably at least 12%, more preferably at least 15%, very preferably at least 20%, by weight, based on the pigment granules, of a compound of the general formula I $$CH_3—(CH_2)_n—CH_2—O—[(CH_2)_p—O]_m—H \qquad I,$$

with n=8-18, preferably n=10-18, more preferably n=12-17, very preferably n=14-16, p=1-4, preferably p=2, and m=35-100, preferably m=35-90, more preferably m=40-80, very preferably m-45-70, optionally a pH regulator, optionally a humidifier, optionally an adhesion agent, optionally a defoamer, optionally a flow assistant and optionally a biocide; may have a weight ratio of the compound of the general formula I to pigment of greater than or equal to the STSA surface area of the pigment in $m^2/g$ multiplied by 0.0021 $g/m^2$; and may have a mass-weighted average particle size of the pigment granules of <20 µm, preferably <15 µm, more preferably <12 µm, very preferably <9 µm.

The invention further provides a process for producing the pigment granules of the invention which is characterized in that 40-65%, preferably 43-63%, more preferably 45-60%, very preferably 45-56%, by weight, based on the pigment granules, of pigment and at least 10%, preferably at least 12%, more preferably at least 15%, very preferably at least 20%, by weight, based on the pigment granules, of a compound of the general formula I, with a weight ratio of the compound of the general formula I to pigment of greater than or equal to the STSA surface area of the pigment in $m^2/g$ multiplied by 0.0021 $g/m^2$, are dispersed in a solvent and subsequently the resulting dispersion is dried.

Solvents used may be water, glycol, glycerol, alcohols, ketones or mixtures of the aforementioned compounds.

The dispersing may take place by means of bead mills, planetary mills, ultrasound, stirring and mixing elements, dissolvers, shaker mixers, for example Skandex, rotor-stator dispersing assemblies, for example Ultra-Turrax, or high-pressure homogenizers.

The dispersion may be dried by means of freeze drying, infrared drying, microwave drying or spray drying.

Spray drying may take place in a spray dryer with nozzle atomization and with cocurrent, half-countercurrent (fountain atomization) or countercurrent gas routing.

Atomization in the spray drier may take place by means of one-fluid or multi-fluid nozzles. The nozzle apertures may be from 0.01 to 3 mm, preferably from 0.05 to 2 mm, more preferably from 0.1 to 1.5 mm. Atomizing media used may be gaseous substances, for example air, nitrogen, $CO_2$ and argon. Nozzles used may be full cone, hollow cone, flat jet and straight jet nozzles.

The spraying of the dispersion that has been obtained into the spray drier may be assisted by external fields. The external fields may be electrical or acoustic fields, ultrasound for example.

The spraying of the dispersion that has been obtained into the spray drier may take place via rotary atomizers, pressure atomizers, vibratory atomizers or Venturi nozzles.

The droplet size generated by the sprayed introduction into the spray drier may be from 50 nm to 3 mm, preferably from 100 nm to 1 mm, more preferably from 200 nm to 0.5 mm.

Spray drying may be carried out at an entry temperature of 80-500° C., preferably of 80-250° C. The exit temperature may be 10-150° C., preferably 15-90° C.

Spray drying may be carried out at a pressure level downstream of the nozzle of 0.03 to 1.2 bar.

Spray drying may be carried out at a pressure level in the nozzle of 0.8 to 8 bar.

Drying of the dispersion may be carried out preferably by spray drying at an entry temperature of 80-500° C., preferably 80-250° C., a pressure level in the nozzle of 0.8 to 8 bar and a nozzle aperture of 0.01 to 3 mm, preferably of 0.05 to 2 mm, more preferably of 0.1 to 1.5 mm.

The pigment granules of the invention may be used for colouring and/or antistatic treatment in water-based paint and surface-coating systems, emulsion paints, printing inks, liquid-ink systems and coating systems.

The invention further provides a surface-coating material comprising at least pigment granules of the invention.

The pigment granules of the invention advantageously have a very good stir-in dispersibility in water or water-based coating systems in conjunction with very good surface-coating material coloristics, and in the crosslinked coating film do not exhibit floating (migration to the surface of the coating film) of any of the components of the pigment granules.

EXAMPLES

Examples 1-8

Production of the Pigment Granules for Examples 1-8

The compositions of the aqueous pigment dispersions are set out in Table 1.

TABLE 1

| | Pigment dispersions Example | | | | | | | |
|---|---|---|---|---|---|---|---|---|
| Ingredients [% by weight] | 1 Comparative example | 2 Comparative example | 3 Comparative example | 4 Comparative example | 5 | 6 | 7 | 8 |
| Colour black S 160 | 14 | | | | | | | |
| Colour black FW 171 | | 19.3 | 12 | 13 | 11.7 | 12 | 13 | 13 |
| Alkanol S 20 | 8 | | | | | | | |
| Alkanol S 60 | | | | | 9.1 | 9.7 | 10 | 10.8 | 11.7 |
| Lutensol AO 30 | | 12.9 | 10.4 | | | | | |
| AMP 90 | 0.1 | | | 0.2 | 0.2 | 0.2 | 0.2 | 0.2 |
| 2-Di-methyl-amino-ethanol | | 0.1 | 0.1 | | | | | |
| TEGO Antifoam XP 7001 | | 0.1 | 0.25 | | | | | |
| Acticide MBS | 0.3 | 0.3 | 0.3 | | | | | |
| Isopropanol | | | | | | 2.4 | | |
| Water | 77.6 | 67.3 | 76.95 | 77.7 | 76 | 77.8 | 76 | 75.1 |
| Total | 100 | 100 | 100 | 100 | 100 | 100 | 100 | 100 |

Alkanol S 20 is a compound of the general formula I with p=2, m=20 and n=16 from Tego (class: fatty alcohol ethoxylates).

Alkanol S 60 is a compound of the general formula I with p=2, m=60 and n=16 from Tego (class: fatty alcohol ethoxylates).

Lutensol AO 30 is a compound of the general formula I with p=2, m=30 and n=11-13 from BASF AG (class: oxo alcohol ethoxylates).

Colour black S 160 is a gas black with an average STSA of 123 $m^2/g$ from Evonik Degussa GmbH.

Colour black FW 171 is a furnace black with an average STSA of 380 $m^2/g$ from Evonik Degussa GmbH.

AMP 90 is a 2-amino-2-methyl-propanol from Angus Chemie.

2-Di-methyl-amino-ethanol is an amine from Merck KGaA.

TEGO Antifoam XP 7001 is a defoamer from Evonik Tego.

Acticide MBS is a biocide from Thor Chemie.

1. Preparation of the Wetting Agent Solutions for Examples 1 to 8

The compound of the general formula I is first melted and the water to be used is heated to about 45° C. Subsequently, using a dissolver, the two components in the proportion as per Table 1 are mixed for 60 minutes. Subsequently the wetting agent solution of the pH regulator, optionally defoamer, isopropanol and biocide as specified in Table 1 is added.

2. Incorporation/Predispersing of the Pigments into the Prepared Wetting Agent Solutions To prepare the various pigment dispersions 1 to 8, the corresponding pigment is incorporated with slow stirring into the prepared wetting agent solution.

3. Dispersing

The pigment dispersions 1 to 8 prepared in section 2 are dispersed with a CoBall-Mill MS12 annular gap bead mill (AGBM) from FrymaKoruma using zirconium oxide grinding media (0.75-1.0 mm, yttrium-stabilized). The grinding media charge is 60% and the peripheral speed is 12 m/s. 9 passes are run in each case. The pigment dispersions 1-8 after dispersing give rise to highly mobile, homogenous dispersions.

4. Spray Drying

Pigment dispersions 1 to 8 are subsequently spray dried (Büchi 190 Mini Spray Dryer, nozzle aperture 0.5 mm, pressure level in the nozzle 2 bar). The dispersion is conveyed to the spraying nozzle by means of a peristaltic pump and drying takes place at an entry temperature of 200° C. and an exit temperature of 80° C. The granules are deposited via a cyclone. This results in the pigment granule compositions calculated in Table 2. For the calculation it is assumed that the auxiliaries AMP 90, 2-di-methyl-amino-ethanol, Antifoam XP 7001, Acticide MBS and isopropanol, in view of their low proportion and low boiling point, need no longer be taken into account after spray drying. Furthermore, the residual moisture content of the pigment granules is measured and is subtracted from 100%, and so the remainder is divided between the pigment and the compound of the general formula I.

Tego Dispers 760W, 35% form is a wetting and dispersing assistant from Tego.

Tego Foamex 830 is a defoamer from Tego.

Items 1 to 4 are weighed out into a Skandex dispersing beaker (180 ml, diameter 5.3 cm, height 12.5 cm) and homogenized with a spatula. The pigment black, dried at 105° C. beforehand, is weighed in and incorporated by stirring with a spatula until the entire amount is wetted.

The millbase is predispersed with a laboratory dissolver (Pendraulik, LR 34) for 5 minutes at 4000 rpm with a dispersing disc having a diameter of 40 mm.

Preliminary dispersion is followed by a check on the pH. The pH is adjusted to a figure between 8.5 and 9.0 by addition of AMP 90.

Then 540 g of Chromanit steel beads, diameter 3 mm, are added to the millbase.

The pigment black is ground using a laboratory shaker (Skandex disperser BA-S 20). The dispersing time is 60 minutes. The cooling of the laboratory shaker is set at level 2.

After the dispersing operation, the millbase is sieved off using a VA stainless steel sieve and collected in a 350 ml plastic beaker. Then a pH check is carried out again and the pH, where appropriate, is adjusted to a level between 8.2-8.7 by addition of AMP 90.

The letdown binder used is a polyurethane dispersion from Alberdingk & Boley, Alberdingk U710 (30% form).

TABLE 2

| | Comparative examples | | | Inventive pigment granules | | | | |
| --- | --- | --- | --- | --- | --- | --- | --- | --- |
| | Example | | | | | | | |
| Ingredients [% by weight] | 1 | 2 | 3 | 4 | 5 | 6 | 7 | 8 |
| Colour black S 160 | 62.6 | | | | | | | |
| Colour black FW 171 | | 58.7 | 53.0 | 58.0 | 51.7 | 52.0 | 53.0 | 51.1 |
| Alkanol S 20 | 35.9 | | | | | | | |
| Alkanol S 60 | | | | 40.6 | 43.2 | 43.4 | 44.2 | 46.1 |
| Lutensol AO 30 | | 39.2 | 45.1 | | | | | |
| Residual moisture content | 1.5 | 2.1 | 1.9 | 1.4 | 5.1 | 4.6 | 2.8 | 2.8 |
| Total | 100 | 100 | 100 | 100 | 100 | 100 | 100 | 100 |
| Mass-weighted average particle size $d_{50,3}$ [μm] | 7.61 | 8.01 | 7.88 | 6.75 | 7.54 | 6.18 | 8.12 | 9.34 |
| Weight ratio compound of the formula I/pigment | 0.57 | 0.67 | 0.85 | 0.70 | 0.84 | 0.84 | 0.83 | 0.90 |

Coating Experiments

Employed as reference coatings A-C to the inventive coatings are coating materials produced by conventional dispersing on the basis of the corresponding pigment blacks 5160 and FW 171.

a. Production of the Reference Coatings A-C

The millbase composition of the reference coatings for pigment blacks 5160 and FW 171 is as follows:

| 1. Distilled water | 48.4 g |
| --- | --- |
| 2. Tego Dispers 760W, 35% form | 20.8 g |
| 3. Tego Foamex 830 | 0.3 g |
| 4. AMP 90 | 0.1 g |
| 5. Pigment black | 10.4 g |
| Total | 80.0 g |
| Carbon black concentration | 13% |

The millbases produced as described above are letdown as follows:

Letdowns for the reference coatings A and B to Examples 1-3:

| 1. Millbase | 5.6 g |
| --- | --- |
| 2. Alberdingk U710, 30% form | 24.4 g |
| Total | 30 g |
| Carbon black concentration, total | 2.4% |

Letdowns for the reference coating C to Examples 4-8:

| 1. Millbase | 5.6 g |
| --- | --- |
| 2. Alberdingk U710, 30% form | 42.9 g |
| Total | 48.5 g |
| Carbon black concentration, total | 1.5% |

The quantities of millbase and binder are weighed out in the order stated into a 180 ml mixing beaker and then vigorously homogenized with a spatula for 10 minutes. After an hour the grindometer value (fineness of grind) is determined with an Erichsen grindometer block in accordance with DIN EN ISO 1524.

b. Production of the Coatings Based on Pigment Granules 1-8 (Table 2)

A Skandex dispersing beaker (180 ml, diameter 5.3 cm, height 12.5 cm) is charged with fully demineralized water, and in each case one set of granules 1-8 is incorporated by stirring with the aid of a spatula. This is followed by dispersing using a dissolver at 3000 rpm for 10 minutes, with a dissolver disc having a diameter of 40 mm.

The ratio of fully demineralized water to granules is selected so as to produce a concentration of 15% by weight of pigment. The pastes are left to stand overnight.

The concentrated pastes thus produced are letdown using the letdown binder Alberdingk U710 (30% form) from Alberdingk & Boley.

The carbon black concentration of the letdowns is 2.4% for the coatings of Examples 1-3; the carbon black concentration of the letdowns is 1.5% for the coatings of Examples 4-8.

The quantities of paste and binder are weighed out into the 180 ml mixing beaker and then homogenized vigorously with the spatula for 10 minutes. After an hour the grindometer value (fineness of grind) is determined using an Erichsen grindometer block to DIN EN ISO 1524.

c. Application of Reference Coatings A-C from a and of the Coatings from b, and Measurement of the Coloristics The completed coating materials are drawn down onto glass plates (130×90×1 mm) with a film drawing bar having a slot height of 200 µm, wet, with uniform tension and pressure. For this purpose, 2 ml of the completed coating material are withdrawn using a plastic pipette for the drawdown, and applied to the glass plate in a stripe 5 cm long and about 1 cm wide. Care should be taken to ensure that there are no air bubbles in the coating stripe. The film drawing bar is placed over the stripe of coating material and drawn uniformly across the plate. A drawdown is produced which is approximately 10 cm long and 6 cm wide.

After the drawdown procedure, the wet coating film on the glass plate is flashed off at room temperature for 30 minutes and then the coated glass plate is subjected to forced drying at 80° C. for 30 minutes.

The coloristics measurements are carried out using the Pausch Q-Color 35 instrument and the WinQC+ software. All of the measurements take place from behind, through the coated glass.

Calculations of the Coloristic Data:

Hue-independent black value My and hue-dependent black value Mc:

First of all, the hue-independent black value My is calculated (equation 1) from the tristimulus Y of the measurement (illuminant D65/10):

$$My = 100 \cdot \log\left(\frac{100}{Y}\right) \quad (1)$$

Subsequently the hue-dependent black value is calculated (equation 2):

$$Mc = 100 \cdot \left(\log\left(\frac{X_n}{X}\right) - \log\left(\frac{Z_n}{Z}\right) + \log\left(\frac{Y_n}{Y}\right)\right) \quad (2)$$

$X_n/Z_n/Y_n$ (DIN 6174)=tristimulus values of the coordinate origin, based on the illuminant and the observer (DIN 5033/part 7, illuminant D65/10°.
$X_n$=94.81 $Z_n$=107.34 $Y_n$=100.0
X/Y/Z=tristimulus values calculated from the measurements of the samples.

Absolute Hue Contribution Dm:

The absolute hue contribution dM is calculated (equation 3) from the black values Mc and My:

$$dM = Mc - My \quad (3)$$

Table 3 compares the results for the coatings tests of pigment granules 1-8 with the corresponding results of the coatings tests for the reference coatings. The greater the value for the colour depth $M_y$, the deeper in colour ("blacker") the corresponding coating film. The greater the value for the undertone dM, the more stable the pigment distribution in the coating film and the bluer the appearance of the black coating film. For a positive assessment, the values for the colour depth $M_y$ and the undertone dM of the coating films based on the corresponding pigment granules must be at least at the level of the colour depth values $M_y$ and the undertones dM of the corresponding reference coating films. Furthermore, the fineness of grind ought to have a value of less than 10 µm, and the surface ought to be visually good, without inhomogeneities and agglomerated pigment particles, and the compound of the formula I must not migrate to the surface of the coating film (float) after a storage time of 48 hours.

TABLE 3

| Coating material | Pigment granules/ pigment black | $M_Y$ through glass | dM through glass | Fineness of grind [µm] | Surface quality, floating |
|---|---|---|---|---|---|
| Reference coating A | Colour black S160 | 267 | 8 | <10 | satisfactory |
| Reference coating 1 | Example 1 | 254 | −1 | bitty | matt, bitty, compound of formula I floats |
| Reference coating B | Colour black FW 171 | 319 | 10 | <10 | satisfactory |
| Reference coating 2 | Example 2 | 304 | 10 | >50 | rough surface, visible PB agglomerates |
| Reference coating 3 | Example 3 | 312 | 11 | <10 | compound in formula I floats |
| Reference coating C | Colour black FW 171 | 303 | 10 | <10 | satisfactory |
| Reference coating 4 | Example 4 | 290 | 8 | 14 bits up to 20 | bitty surface, no floating of compound of the formula I |
| Inventive coating 5 | Example 5 | 315 | 13 | <10 | satisfactory |

TABLE 3-continued

| Coating material | Pigment granules/ pigment black | $M_Y$ through glass | dM through glass | Fineness of grind [μm] | Surface quality, floating |
|---|---|---|---|---|---|
| Inventive coating 6 | Example 6 | 313 | 12 | <10 | satisfactory |
| Inventive coating 7 | Example 7 | 304 | 12 | <10 | satisfactory |
| Inventive coating 8 | Example 8 | 321 | 13 | <10 | satisfactory |

Reference coating 1 does not match the coloristics of reference coating A. Colour depth $M_y$ and blue undertone dM are not achieved. The surface is not satisfactory and the compound of the formula I with m=20 floats.

Reference coating 2 does not match the coloristics of reference coating B. Colour depth $M_y$ is not achieved. The surface is rough, with visible pigment agglomerates. The ratio of compound of the formula I to pigment black is too low. Compound I with m=30 floats.

Reference coating 3 almost matches the coloristics of reference coating B. The fineness of grind is satisfactory. The ratio of compound of the formula I to pigment black is satisfactory. However, compound of the formula I with m=30 floats as before.

Reference coating 4 containing compound of the formula I with m=60 no longer floats. However, the ratio of compound of the formula I to pigment black FW 171 is too small. The surface of the coating film is bitty, the fineness of grind is unsatisfactory, and the coloristic data of reference coating C are not achieved.

The inventive coating materials 5-8 exceed the coloristic data of reference coating C. The finenesses of grind are <10 μm, and the surfaces of the coating films are free from bits and satisfactory. The compound of the formula I does not float.

The invention claimed is:

1. Pigment granules comprising 40-65% by weight, based on the pigment granules, of pigment and at least 10% by weight, based on the pigment granules, of a compound of formula I:

$$CH_3-(CH_2)_n-CH_2-O-[(CH_2)_p-O]_m-H \quad (I)$$

wherein:
n=8-18, p=1-4; and m=35-100;
the weight ratio of the compound of formula I to pigment is greater than or equal to the STSA surface area of the pigment in m²/g multiplied by 0.0021 g/m²; and
the mass-weighted average particle size of the pigment granules is <20 μm.

2. The pigment granules of claim 1, wherein the pigment is a chromatic pigment, a carbon aerogel or a carbon black.

3. The pigment granules of claim 1, wherein said pigment is selected from the group consisting of gas black, furnace black, Pigment Yellow 74, Pigment Blue 15:3 and Pigment Red 122.

4. The pigment granules of claim 1, wherein the compound of formula I is selected from the group consisting of:
$CH_3-(CH_2)_{10}-CH_2-O-[(CH_2)_2-O]_{35}-H$;
$CH_3-(CH_2)_{12}-CH_2-O-[(CH_2)_2-O]_{35}-H$;
$CH_3-(CH_2)_{14}-CH_2-O-[(CH_2)_2-O]_{35}-H$;
$CH_3-(CH_2)_{16}-CH_2-O-[(CH_2)_2-O]_{35}-H$;
$CH_3-(CH_2)_{18}-CH_2-O-[(CH_2)_2-O]_{35}-H$;
$CH_3-(CH_2)_{10}-CH_2-O-[(CH_2)_2-O]_{60}-H$;
$CH_3-(CH_2)_{12}-CH_2-O-[(CH_2)_2-O]_{60}-H$;
$CH_3-(CH_2)_{14}-CH_2-O-[(CH_2)_2-O]_{60}-H$;
$CH_3-(CH_2)_{16}-CH_2-O-[(CH_2)_2-O]_{60}-H$;
$CH_3-(CH_2)_{18}-CH_2-O-[(CH_2)_2-O]_{60}-H$;
$CH_3-(CH_2)_{10}-CH_2-O-[(CH_2)_2-O]_{90}-H$;
$CH_3-(CH_2)_{12}-CH_2-O-[(CH_2)_2-O]_{90}-H$;
$CH_3-(CH_2)_{14}-CH_2-O-[(CH_2)_2-O]_{90}-H$;
$CH_3-(CH_2)_{16}-CH_2-O-[(CH_2)_2-O]_{90}-H$; and
$CH_3-(CH_2)_{18}-CH_2-O-[(CH_2)_2-O]_{90}-H$.

5. The pigment granules of claim 4, wherein the pigment is a chromatic pigment, a carbon aerogel or a carbon black.

6. The pigment granules of claim 1, wherein said pigment granules have a residual moisture content of 0% to 20% by weight.

7. The pigment granules of claim 6, wherein the pigment is a chromatic pigment, a carbon aerogel or a carbon black.

8. The pigment granules of claim 7, wherein the compound of formula I is selected from the group consisting of:
$CH_3-(CH_2)_{10}-CH_2-O-[(CH_2)_2-O]_{35}-H$;
$CH_3-(CH_2)_{12}-CH_2-O-[(CH_2)_2-O]_{35}-H$;
$CH_3-(CH_2)_{14}-CH_2-O-[(CH_2)_2-O]_{35}-H$;
$CH_3-(CH_2)_{16}-CH_2-O-[(CH_2)_2-O]_{35}-H$;
$CH_3-(CH_2)_{18}-CH_2-O-[(CH_2)_2-O]_{35}-H$;
$CH_3-(CH_2)_{10}-CH_2-O-[(CH_2)_2-O]_{60}-H$;
$CH_3-(CH_2)_{12}-CH_2-O-[(CH_2)_2-O]_{60}-H$;
$CH_3-(CH_2)_{14}-CH_2-O-[(CH_2)_2-O]_{60}-H$;
$CH_3-(CH_2)_{16}-CH_2-O-[(CH_2)_2-O]_{60}-H$;
$CH_3-(CH_2)_{18}-CH_2-O-[(CH_2)_2-O]_{60}-H$;
$CH_3-(CH_2)_{10}-CH_2-O-[(CH_2)_2-O]_{90}-H$;
$CH_3-(CH_2)_{12}-CH_2-O-[(CH_2)_2-O]_{90}-H$;
$CH_3-(CH_2)_{14}-CH_2-O-[(CH_2)_2-O]_{90}-H$;
$CH_3-(CH_2)_{16}-CH_2-O-[(CH_2)_2-O]_{90}-H$; and
$CH_3-(CH_2)_{18}-CH_2-O-[(CH_2)_2-O]_{90}-H$.

9. The pigment granules of claim 1, wherein said pigment granules comprise 45-56% by weight, based on the pigment granules, of pigment.

10. The pigment granules of claim 9, comprising at least 20% by weight, based on the pigment granules, of a compound of formula I.

11. The pigment granules of claim 10, wherein, in formula I, n=14-16.

12. The pigment granules of claim 11, wherein, in formula I, p=2.

13. The pigment granules of claim 12, wherein, in formula I, m=45-70.

14. The pigment granules of claim 13, wherein the mass-weighted average particle size of the pigment granules is <9 μm.

15. The pigment granules of claim 14, wherein the pigment is a chromatic pigment, a carbon aerogel or a carbon black.

16. The pigment granules of claim 14, wherein said pigment is selected from the group consisting of gas black, furnace black, Pigment Yellow 74, Pigment Blue 15:3 and Pigment Red 122.

17. The pigment granules of claim 10, wherein the compound of formula I is selected from the group consisting of:

$CH_3-(CH_2)_{10}-CH_2-O-[(CH_2)_2-O]_{35}-H$;
$CH_3-(CH_2)_{12}-CH_2-O-[(CH_2)_2-O]_{35}-H$;
$CH_3-(CH_2)_{14}-CH_2-O-[(CH_2)_2-O]_{35}-H$;
$CH_3-(CH_2)_{16}-CH_2-O-[(CH_2)_2-O]_{35}-H$;
$CH_3-(CH_2)_{18}-CH_2-O-[(CH_2)_2-O]_{35}-H$;
$CH_3-(CH_2)_{10}-CH_2-O-[(CH_2)_2-O]_{60}-H$;
$CH_3-(CH_2)_{12}-CH_2-O-[(CH_2)_2-O]_{60}-H$;
$CH_3-(CH_2)_{14}-CH_2-O-[(CH_2)_2-O]_{60}-H$;
$CH_3-(CH_2)_{16}-CH_2-O-[(CH_2)_2-O]_{60}-H$;
$CH_3-(CH_2)_{18}-CH_2-O-[(CH_2)_2-O]_{60}-H$;
$CH_3-(CH_2)_{10}-CH_2-O-[(CH_2)_2-O]_{90}-H$;
$CH_3-(CH_2)_{12}-CH_2-O-[(CH_2)_2-O]_{90}-H$;
$CH_3-(CH_2)_{14}-CH_2-O-[(CH_2)_2-O]_{90}-H$;
$CH_3-(CH_2)_{16}-CH_2-O-[(CH_2)_2-O]_{90}-H$;
$CH_3-(CH_2)_{18}-CH_2-O-[(CH_2)_2-O]_{90}-H$;

and, wherein the mass-weighted average particle size of the pigment granules is <9 μm.

18. The pigment granules of claim 1, wherein, apart from said compound of formula I, said pigment granules are dispersant-free.

19. A process for producing the pigment granules of claim 1, comprising:
 a) dispersing 40-65% by weight, based on the pigment granules, of pigment and at least 10% by weight, based on the pigment granules, of a compound of formula I, in a solvent, wherein the weight ratio of the compound of formula I to pigment is greater than or equal to the STSA surface area of the pigment in $m^2/g$ multiplied by 0.0021 $g/m^2$,
 b) drying the dispersion of step a).

20. A surface-coating material comprising the pigment granules of claim 1.

* * * * *